(12) United States Patent  (10) Patent No.: US 7,984,606 B2
Smith                      (45) Date of Patent:     Jul. 26, 2011

(54) SYSTEMS AND METHODS FOR THERMAL MANAGEMENT IN A GAS TURBINE POWERPLANT

(75) Inventor: J. Walter Smith, Seneca, SC (US)

(73) Assignee: Propulsion, Gas Turbine, and Energy Evaluations, LLC, Seneca, SC (US)

( * ) Notice: Subject to any disclaimer, the term of this patent is extended or adjusted under 35 U.S.C. 154(b) by 434 days.

(21) Appl. No.: 12/290,738

(22) Filed: Nov. 3, 2008

(65) Prior Publication Data

US 2010/0107603 A1    May 6, 2010

(51) Int. Cl.
F02K 99/00 (2009.01)
(52) U.S. Cl. .................. 60/266; 60/39.08; 60/734
(58) Field of Classification Search ............... 60/39.08, 60/266, 267, 734; 184/6.11
See application file for complete search history.

(56) References Cited

U.S. PATENT DOCUMENTS

| | | | |
|---|---|---|---|
| 2,353,966 A | 7/1944 | Newcombe | |
| 2,865,580 A | 12/1958 | Marshall | |
| 3,080,716 A | 3/1963 | Cummings et al. | |
| 3,300,965 A * | 1/1967 | Sherlaw et al. | 60/39.08 |
| 3,382,672 A | 5/1968 | French | |
| 3,656,872 A * | 4/1972 | Jubb | 417/364 |
| 3,779,007 A | 12/1973 | Lavash | |
| 3,874,168 A | 4/1975 | Toure | |
| 4,007,786 A * | 2/1977 | Schlinger | 166/266 |
| 4,020,632 A | 5/1977 | Coffinberry et al. | |
| 4,104,873 A | 8/1978 | Coffinberry | |
| 4,151,710 A | 5/1979 | Griffin et al. | |
| 4,171,183 A | 10/1979 | Cornell et al. | |
| 4,273,304 A | 6/1981 | Frosch et al. | |
| 4,505,124 A | 3/1985 | Mayer | |
| 4,546,605 A | 10/1985 | Mortimer et al. | |
| 4,696,156 A | 9/1987 | Burr et al. | |
| 4,705,100 A | 11/1987 | Black et al. | |
| 4,776,536 A | 10/1988 | Hudson et al. | |
| 4,899,535 A | 2/1990 | Dehan et al. | |
| 4,999,994 A | 3/1991 | Riid et al. | |
| 5,000,003 A * | 3/1991 | Wicks | 60/618 |

(Continued)

OTHER PUBLICATIONS

Written Opinion with International Search Report, PCT Appln. No. PCT/US09/05658, Dec. 16, 2009.

(Continued)

*Primary Examiner* — Michael Cuff
*Assistant Examiner* — Phutthiwat Wongwian
(74) *Attorney, Agent, or Firm* — David M. Quinlan, P.C.

(57) ABSTRACT

A thermal management system for a gas turbine powerplant with an engine oil line and an engine fuel line incorporates a heat transfer control module that includes a reversible heat pump with a heat pump compressor for circulating working fluid in forward and reverse directions through a working fluid line of the heat pump. The heat control module also includes a first heat exchanger having a heat exchange path for the working fluid between the compressor and a heat pump expansion valve and another heat exchange path for the engine oil. A second heat exchanger has a heat exchange path for the working fluid between the compressor and the expansion valve and another heat exchange path for the engine fuel. The heat pump can be operated in forward or reverse directions depending on whether heat is to be transferred from the engine oil or the fuel to the heat pump working fluid. In another embodiment an engine oil reservoir located between the first heat exchanger and the engine collects the oil before it is introduced to the engine and thus acts as a heat capacitor for the system.

23 Claims, 7 Drawing Sheets

U.S. PATENT DOCUMENTS

| | | | |
|---|---|---|---|
| 5,174,719 A | | 12/1992 | Walsh et al. |
| 5,264,244 A | | 11/1993 | Edwards, III |
| 5,423,174 A | * | 6/1995 | Mouton .................. 60/39.093 |
| 5,438,823 A | | 8/1995 | Loxley et al. |
| 5,615,547 A | * | 4/1997 | Beutin et al. ................ 60/39.08 |
| 6,182,435 B1 | | 2/2001 | Niggemann et al. |
| 6,298,677 B1 | | 10/2001 | Bujak, Jr. |
| 6,324,849 B1 | * | 12/2001 | Togawa et al. ................ 60/616 |
| 6,668,542 B2 | | 12/2003 | Baker et al. |
| 6,682,016 B1 | | 1/2004 | Peroulakis |
| 6,931,834 B2 | | 8/2005 | Jones |
| 6,939,392 B2 | | 9/2005 | Huang et al. |
| 7,213,391 B2 | | 5/2007 | Jones |
| 7,287,368 B2 | | 10/2007 | Tumelty et al. |
| 7,309,210 B2 | | 12/2007 | Suciu et al. |
| 2004/0226296 A1 | * | 11/2004 | Hanna et al. .................. 60/671 |
| 2008/0017238 A1 | | 1/2008 | Fei et al. |

OTHER PUBLICATIONS

Lemanski, A. J., et al., "Relative Vulnerability and Cost-Effectiveness Study of Transmission Oil Heat Rejection Systems", U.S. USAAVLABS Technical Report 68-78, Nov. 1968.

* cited by examiner

SYSTEMS AND METHODS FOR THERMAL MANAGEMENT IN A GAS TURBINE POWERPLANT

BACKGROUND OF THE INVENTION

1. Field of the Invention

The present invention relates to systems and methods for controlling temperatures of fluids in powerplants, and more particularly, to thermal management systems and methods for controlling fuel and lubricant temperatures in gas turbine engines.

2. Description of Related Art

Gas turbine engines, particularly aircraft powerplants, conventionally use engine fuel as a heat sink to cool electric and electronic components such as engine control systems and/or to cool liquids within the engine such as the engine lubricant and hydraulic fluids for engine control and actuation systems. U.S. Pat. No. 2,865,580, No. 3,080,716 and No. 3,779,007 describe examples of these types of cooling systems. Aircraft also conventionally use engine fuel as a heat sink to cool aircraft components like avionics and/or to cool liquids within the aircraft such as gearbox or generator lubricants and hydraulic fluids for aircraft control and actuation systems. U.S. Pat. No. 4,776,536 and No. 4,505,124 describe examples of these types of cooling systems.

One of the drawbacks of this type of engine thermal management is that the heat added to the fuel by the aircraft and/or engine can cause the engine fuel temperature to exceed operational limits. In some cases, it could even fail to provide adequate cooling of the lubricants and hydraulic fluids for the engine or aircraft, causing them to exceed their operational limits as well. Excessive temperatures of the fuel or lubricants and hydraulic fluids can cause the formation of varnish or coke deposits that can foul engine combustor fuel nozzles, oil jets, and other fuel, control, and lubrication systems components. Accordingly, such deposits can adversely affect the fuel delivery and combustion process, as well as the hydraulic controls and the lubrication and cooling of engine bearings and other parts.

Heat exchangers have been used in a variety of ways to maintain both the fuel and engine oil temperature within acceptable limits, including air/oil heat exchangers, fuel/oil heat exchangers, or both. See, for example, U.S. Pat. No. 4,546,605 and No. 4,696,156. Fuel temperature has also been controlled by re-circulating the fuel through the fuel system and back to the fuel tanks at operational conditions where engine fuel consumption alone does not provide sufficient fuel flow to provide adequate cooling. These types of systems sometimes also use heat exchangers to aid in cooling the fuel. See, for example, U.S. Pat. No. 4,020,632 and No. 4,776,536.

FIGS. 1 to 3 are schematic depictions of exemplary aircraft engine thermal management systems employing different combinations of heat exchangers to maintain appropriate temperatures for both the engine fuel and lubricants used in the engine, in the manner discussed above. FIG. 1 illustrates a thermal management system TM1 installed in a ducted fan gas turbine engine of the type shown in U.S. Pat. No. 4,020,632. The system includes an air/oil heat exchanger AOH in the engine's fan bypass duct (see fan bypass duct 26 in U.S. Pat. No. 4,020,632). The heat exchangers referred to in this description are constructed to transfer heat between fluids in two heat exchange paths through the heat exchanger, in a manner well known to aircraft engine designers. A small percentage of the fan bypass duct air flow BPA, flowing in the direction of the arrows, passes through the heat exchanger AOH along a first heat exchange path represented schematically by dashed lines AOP1. Engine oil flowing through an engine oil line EOL in the direction of the arrows passes through another heat exchange path AOP2 of the heat exchanger AOH. The engine lubrication system typically includes multiple sumps similar to the sump 82 in U.S. Pat. No. 4,020,632, from which the oil is introduced to the engine oil line EOL of the thermal management system TM1. After exiting the heat exchanger AOH, the oil is re-introduced to the engine lubrication system through the engine oil line EOL.

The thermal management system TM1 also includes an oil/fuel heat exchanger OFH that transfers heat to the engine fuel from the hot engine oil entering the thermal management system from the engine sumps. A fuel pump EFP pumps fuel from a fuel tank (not shown) through a fuel line in the direction of the arrows in the figure. The engine fuel passes through the heat exchanger OFH along a first heat exchange path represented by solid lines OFP1 and is introduced to the engine from the thermal management system TM1 by an engine fuel line EFL, as regulated by a fuel control valve FCV that receives the fuel from a fuel control line FCL exiting the heat exchanger OFH. The engine oil line EOL passes through a second heat exchange path represented by the dashed lines OFP2 of the heat exchanger OFH before it is introduced into the air/oil heat exchanger AOH.

In operation, the temperature of the hot oil from the engine is reduced by transferring some of its heat content to the fuel being pumped to the engine through the heat exchanger OFH. By the same token, the temperature of the fuel is increased by the heat thus extracted from the oil. As noted above, the fuel temperature cannot exceed certain limits, so the amount of heat that can be transferred to the fuel from the hot engine oil must be maintained at levels that will not cause the fuel to overheat. Other variables to be taken into account are the different fuel flow rates and heat load on the engine oil at different aircraft flight regimes. As a result, the operating characteristics of the oil/fuel heat exchanger OFH may not reduce the oil temperature sufficiently for re-introduction to the engine. As a result, a second heat exchanger, the air/oil heat exchanger AOH described above, is incorporated into the system to further manage the engine oil temperature. This not only adds weight to the aircraft, but also creates a pressure loss in the fan bypass duct airflow BPA, resulting in a reduction in propulsive thrust.

FIG. 2 schematically depicts another example of a typical thermal management system TM2 that can be used on an aircraft engine such as that described in U.S. Pat. No. 4,020, 632. For ease of understanding, similar references are used in FIG. 2 to denote system components that generally correspond to like components in the system depicted in FIG. 1. Accordingly, not all of the references in FIG. 2 are mentioned in this description. As in FIG. 1, the arrows on the depicted fluid flow paths indicate the direction of fluid flow.

Referring to FIG. 2, the system TM2 includes an oil/fuel heat exchanger OFH that transfers heat from the hot engine oil introduced to the system from the engine, in a fashion similar to that employed in the oil/fuel heat exchanger OFH described in connection with FIG. 1. In contrast to the system TM1 in FIG. 1, the oil returns directly to the engine from the heat exchanger OFH in FIG. 2. In addition, the system TM2 includes an air/fuel heat exchanger AFH that transfers heat from the fuel to a fraction of the aircraft inlet or nacelle airflow NCA. The fuel exiting the heat exchanger OFH passes through a recirculation valve RCV that determines the amount of fuel flow through a fuel recirculation line FRL back to the fuel tank (not shown) after cooling by virtue of flowing through the heat exchanger AFH. This re-circulated fuel flow increases the fuel flow through the oil/fuel heat exchanger OFH beyond that provided by fuel control valve FCV to the engine combustors (not shown) through the fuel control line FCL. This increase in fuel flow through the oil/fuel heat exchanger OFH results in an increase in the heat transferred from the engine oil to the fuel and also results in a reduction in fuel temperature entering and exiting the heat exchanger OFH.

This type of system is more effective in using the fuel as a heat sink for the engine oil. It enables the fuel to be maintained at a sufficiently low temperature to adequately cool the engine oil under more varied engine operating conditions, because it does not involve the design compromises that must be built into systems like that shown in FIG. 1, the fuel flow rates of which are limited to that required for engine operation. For example, under engine operating conditions in which the heat load on the engine oil is high, and/or the fuel flow rate required for engine operation is low, the system in FIG. 2 permits more fuel to be re-circulated through the heat exchanger AFH by increasing the fuel flow rate delivered by the pump EFP. By employing appropriate heat-sensing instrumentation, such as the temperature control device TCD illustrated schematically in the engine fuel control line FCL, a servo system can modulate the flow through the valve RCV to maintain a desired fuel temperature limit. In this manner, a thermal management system along the lines of TM2 can cope with a wide variety of engine operating conditions. However, the system may still not be capable of handling all engine and aircraft operating conditions without exceeding either the fuel or engine oil operating temperatures limits, resulting in operational limits on the aircraft.

FIG. 3 shows yet another typical thermal management system TM3, which is particularly adapted for gas turbine engines with separate gearing structures ("gearboxes") for certain engine components. Many existing turbofan aircraft engines have plural engine shafts that rotate at different speeds to better match the rotational speeds of the fan and compressor components to the turbines that are used to drive them. Turboprop engines typically have gearboxes through which the engine main shaft is connected to the propeller to better match the rotational speed of the propeller to the turbine that drives it. Moreover, in the search for greater fuel efficiency, future aircraft gas turbine powerplants are expected to employ geared turbofans to reduce fan speed and engine noise and to incorporate "open rotor" designs to the same ends. U.S. Pat. No. 7,309,210 illustrates an exemplary geared turbofan design, and U.S. Pat. No. 4,171,183 shows a typical "open rotor" design. Gearboxes for these types of engines may have their own lubricating system separate from the main engine lubricating system, as illustrated by the turboprop system disclosed in U.S. Pat. No. 4,999,994. Thus, an engine with a separate gearbox creates another heat load that the engine's thermal management system must account for.

Referring to FIG. 3, the thermal management system TM3 includes separate heat exchangers for the main engine lubricating system and the gear box lubricating system. As in FIG. 2, similar references are used in FIG. 3 to denote system components that generally correspond to like components in the systems depicted in FIGS. 1 and 2, so that not all of the references in FIG. 3 are mentioned in this description. As in FIGS. 1 and 2, the arrows on the depicted fluid flow paths indicate the direction of fluid flow.

The thermal management system TM3 includes an air/oil heat exchanger AOH in a gearbox lubricating oil line GOL. In a fashion similar to that employed with the engine lubricating oil, the gearbox oil re-circulates from a sump (not shown), through the heat exchanger AOH, and then back to the gear box (not shown). A separate heat transfer line EOL for the engine lubricating oil passes through an oil/fuel heat exchanger OFH, so that heat from the engine lubricating oil is transferred to the fuel, in a fashion similar to that described in connection with the heat exchangers OFH in FIGS. 1 and 2.

Features from the thermal management systems described in FIGS. 1 to 3 may also be combined in nearly limitless combinations and permutations. For example, a fuel re-circulation line and its associated heat exchanger in the system TM2 depicted in FIG. 2 could be incorporated into the systems depicted in FIGS. 1 and 3. Some combinations are shown in U.S. Pat. No. 2,865,580, No. 3,080,716, No. 3,779,007, No. 4,776,536, and No. 4,999,994. It should also be noted that the relatively hot engine oil collected from the multiple sumps within the lubrication system may be combined into a single engine oil line (EOL) or gearbox oil line (GOL) as depicted in FIGS. 1-3. Alternatively, these lines may remain separate, for introduction into the heat exchangers via multiple heat exchange paths. Moreover, when multiple lines are used, lubricant from some sumps may not be introduced to more than one heat exchanger, as distinguished from the system depicted in FIG. 1 for example. In summary, FIGS. 1-3 are meant to be representative examples of conventional thermal management systems, and there have been myriad variations on basic systems such as those described above. In systems with multiple oil sumps, the exact configuration can depend on the operating temperature ranges of the oil in the sumps.

Another avenue used to address the management of engine fuel temperatures is to minimize the effects on the engine fuel of excessive temperature by increasing the temperature limits that the fuel can tolerate. In that regard, U.S. Pat. No. 6,939,392 suggests deoxygenating the fuel to allow the fuel to get hotter before the onset of coking, and U.S. Pat. No. 5,264,244 discloses coating fuel system components to reduce coke deposition. However, it would still be desirable to be able to use the fuel to extract heat from the engine or gearbox oil as described above. Permitting the engine fuel to operate at even higher temperature levels can make it more difficult to use the fuel in that capacity.

Although there are ways to tailor prior thermal management systems to the operational requirements of particular engines, and to raise the temperature limits that can be tolerated by the fuel, prior approaches rely heavily on the basic technology of using heat exchangers in different combinations in an effort to provide the required degree of temperature control. In addition, as these systems get more complex, they produce a greater weight penalty, and most important, the limitations inherent in their designs do not provide the maximum degree of temperature control.

There are examples of attempts to make gas turbine engine thermal management systems transfer heat across unfavorable temperature gradients using heat pumps. For example, U.S. Pat. No. 6,182,435 uses a "compression/expansion cooling device" to transfer heat from lower temperature fuel to higher temperature fan duct air. See also U.S. Pat. No. 6,939,392 (heat pump 100). However, no known prior art incorporates a heat pump into an engine thermal management system in a way that takes advantage of the ability of a heat pump to change the direction in which heat is transferred.

SUMMARY OF THE INVENTION

It is an object of the present invention to provide better management of the heat generated by a gas turbine powerplant and carried by its fuel, lubricating fluids, and hydraulic fluids, and more particularly for providing improved heat management in a gas turbine aircraft engine.

In accordance with a first aspect of the invention, a thermal management system for a gas turbine powerplant having a first supply line for a first operating fluid and a second supply line for a second operating fluid includes a heat transfer control module comprising (1) a reversible heat pump including a working fluid line having therein a heat pump compressor for circulating working fluid in forward and reverse directions through the fluid line and an expansion valve for expanding working fluid passing therethrough, (2) a first heat exchanger having a first heat exchange path for the working fluid between the compressor and the expansion valve and a second heat exchange path included in the first supply line, wherein the first and second heat exchange paths permit heat to be exchanged between fluids therein, and (3) a second heat exchanger having a first heat exchange path for the working fluid between the compressor and the expansion valve and a second heat exchange path included in the second supply line, wherein the first and second heat exchange paths permit heat to be exchanged between fluids therein.

In accordance with another aspect of the invention, a system with these features is used in a gas turbine aircraft engine, wherein (1) the first supply line comprises an oil line for introducing engine lubricating oil to an inlet of the second heat exchange path of the first heat exchanger and to the engine from an outlet of the second heat exchange path of the first heat exchanger, the engine lubricating oil being re-introduced to the inlet from the engine, (2) an oil reservoir for collecting the engine lubricating oil before introduction to the engine is disposed in the oil line between the first heat exchanger and the engine, and (3) the second supply line comprises a fuel line for introducing engine fuel to an inlet of the second heat exchange path of the second heat exchanger and to an engine combustor from an outlet of the second heat exchange path of the second heat exchanger.

In accordance with still other aspects of the invention, the heat control module can be used in a gearbox oil circulating system, or one or more auxiliary heat exchangers can be used to transfer heat to or from the engine fuel or the engine lubricating oil or gearbox lubricating oil. Additionally, the heat control module can be used in a thermal management system that re-circulates a portion of the engine fuel to a fuel tank, as described above.

In accordance with a method aspect of the invention, the heat pump is selectively operated in a forward direction wherein heat is transferred from a first operating fluid to the heat pump working fluid in a first heat exchanger and from the working fluid to a second operating fluid in a second heat exchanger, and in a reverse direction wherein heat is transferred from the working fluid to the first operating fluid in the first heat exchanger and from the second operating fluid to the working fluid in the second heat exchanger. Other method aspects of the invention include controlling heat exchange between fluids in the heat exchangers by modulating the operation of the heat pump, and when the heat transfer control module is used with as an aircraft engine, using operational information from aircraft and engine subsystems to control the heat pump operation.

BRIEF DESCRIPTION OF THE DRAWINGS

The objects of the invention will be better understood from the detailed description of its preferred embodiments which follows below, when taken in conjunction with the accompanying drawings, in which like numerals and letters refer to like features throughout. The following is a brief identification of the drawing figures used in the accompanying detailed description.

One skilled in the art will readily understand that the drawings are not strictly to scale, but nevertheless will find them sufficient, when taken with the detailed descriptions of preferred embodiments that follow, to make and use the present invention.

DETAILED DESCRIPTION OF PREFERRED EMBODIMENTS

Figure 3:
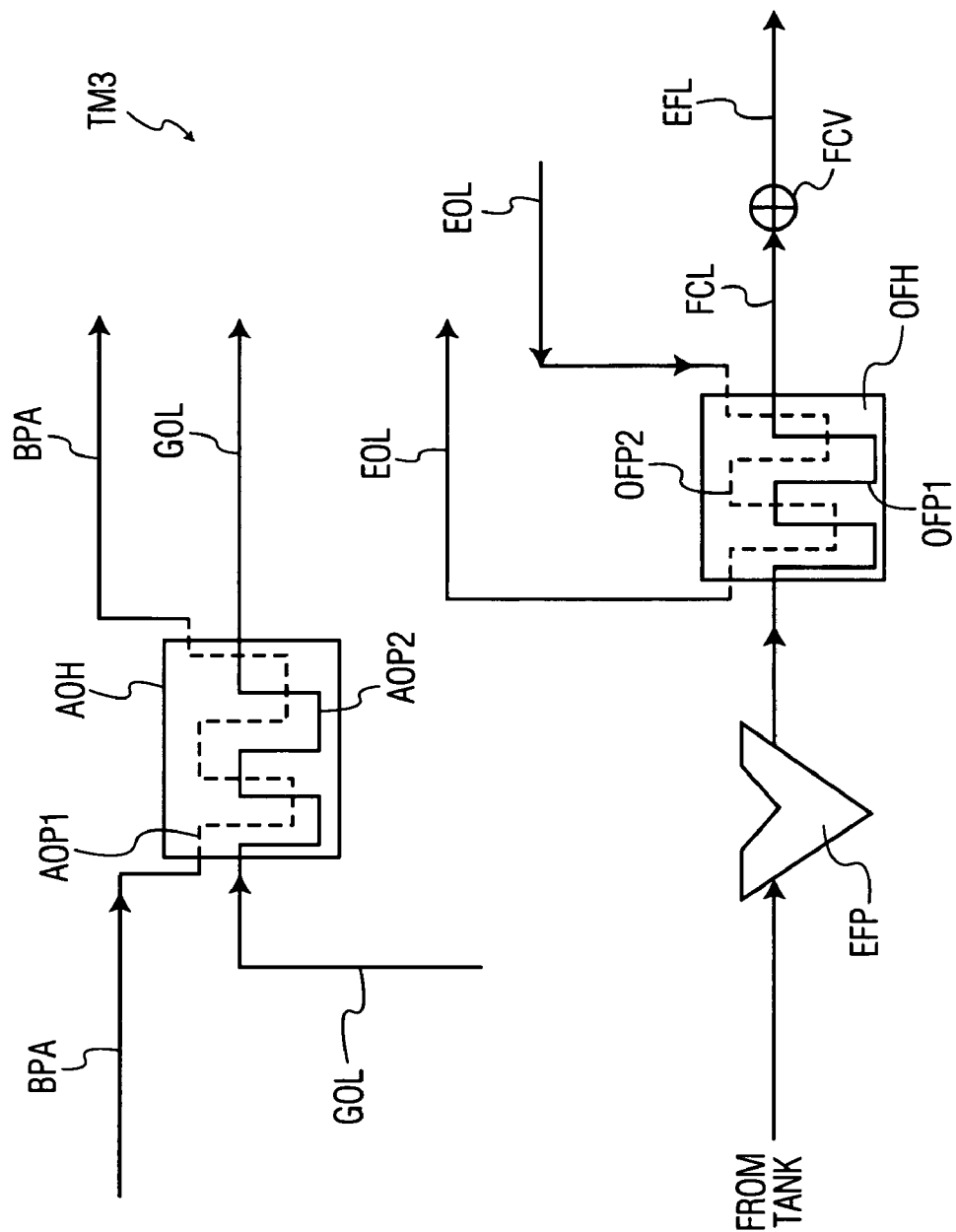
Figure 4:
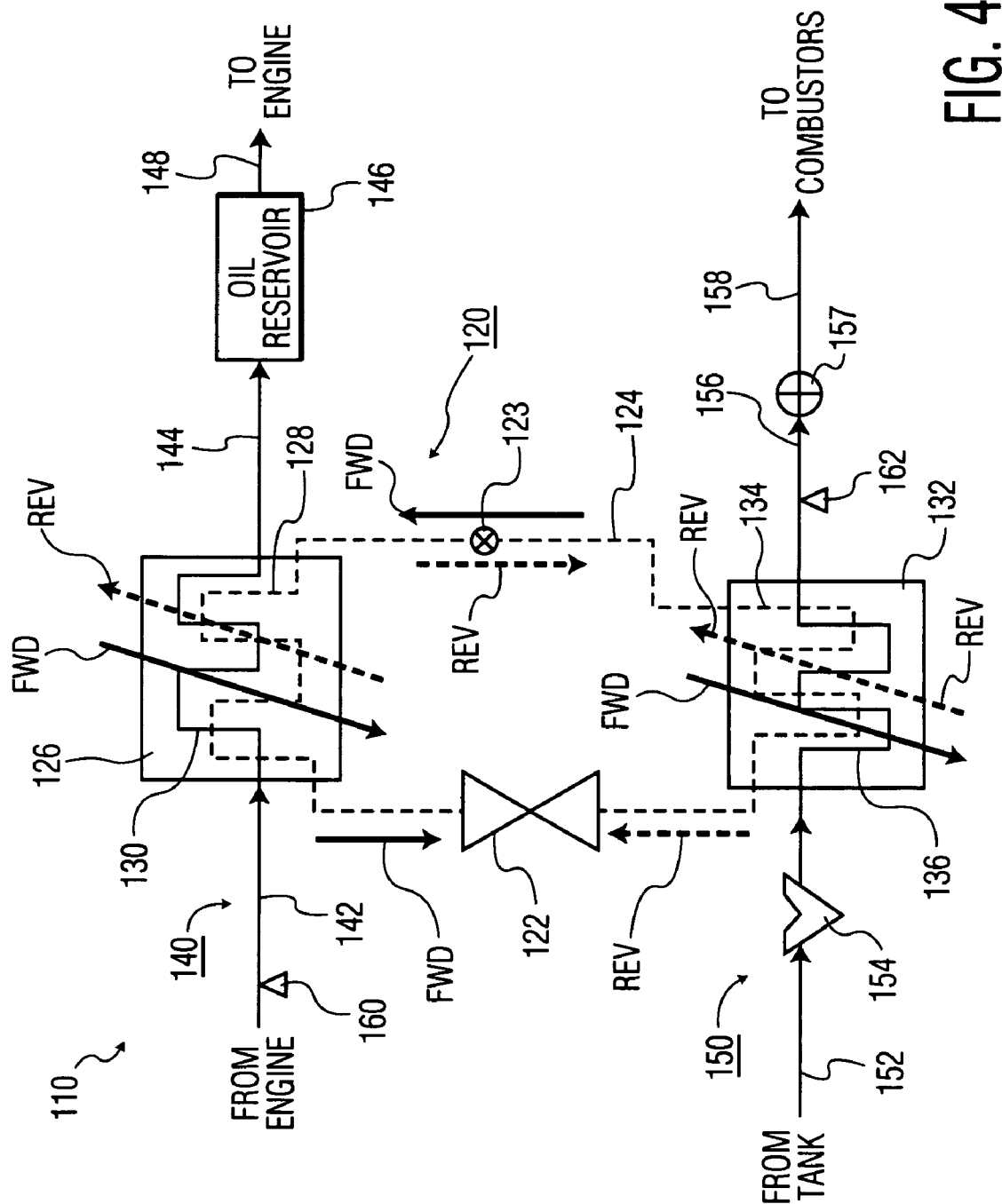
FIG. 4 is a schematic depiction of a thermal management system for an aircraft gas turbine engine according to a basic embodiment of the present invention.

FIG. 4 is a schematic depiction of a first embodiment of the invention incorporating a basic building block of a thermal management system according to the present invention. This basic building block comprises a heat transfer control module with a reversible heat pump that circulates a working fluid through at least two heat exchangers. This module can be included in myriad thermal management systems to optimize thermal management for particular apparatus such as gas turbine aircraft engines like those described above in connection with FIGS. 1 to 3. By employing a reversible heat pump, the present invention provides significantly improved operational flexibility that enables the heat transfer characteristics of the system to be more precisely controlled and more readily tailored to a particular engine across a greater range of operating conditions. When used in combination with a reservoir for a lubricant that circulates through the apparatus, as described below, the system includes a thermal capacitance that further enables more precise control of temperatures within the apparatus. Because of its versatile heat transfer characteristics, a thermal management system according to the invention can be made simpler than prior systems and thus provide weight reductions and concomitant performance advantages over prior systems which do not provide the degree of temperature control achievable with the invention.

The thermal management system 110 depicted in FIG. 4 is shown installed in an aircraft gas turbine engine of the type already described. A heat transfer control module 120 includes a reversible heat pump with a heat pump compressor 122 and an expansion valve 123 in a fluid line 124 for circulating a suitable heat pump working fluid. The construction of the heat pump compressor 122 and expansion valve 123 is conventional, and the working fluid is chosen for its thermodynamic characteristics in accordance with the temperatures of the fluids to and from which heat will be transferred during operation of the system. For example, in a typical gas turbine aircraft engine the working fluid can be water. The module 120 also includes a first heat exchanger 126 with a working fluid heat exchange path 128 (shown in dashed lines for clarity) for the heat pump working fluid. The first heat exchanger 126 further includes another heat exchange path 130 for a fluid associated with the operation of the engine; in the system depicted in FIG. 4 the fluid is engine lubricating oil. The module 120 also includes a second heat exchanger 132 with a heat pump working fluid heat exchange path 134. The second heat exchanger further includes another heat exchange path 136 for a second fluid associated with the operation of the engine; in this embodiment the second fluid is engine fuel.

The heat pump compressor 122 has conventional compression structure and valve system that permits the heat pump to circulate fluid through the line 124 in a forward direction depicted by the solid-line arrows FWD, and in the opposite direction depicted by the dashed-line arrows REV. The heat pump operates in accordance with known principles of thermodynamics in that the fluid entering the heat pump compressor, regardless of the direction of working fluid flow, is in a gaseous state. The heat pump compressor compresses the gaseous working fluid sufficiently to cause it to condense and become a liquid when heat is extracted from it in the heat exchanger 126 or 132. The condensed liquid, which is at a high pressure when leaving one of heat exchangers 126 or 132, is expanded to a liquid/gas mixture in the expansion valve 123, and heat is absorbed into the working fluid as the mixture becomes gaseous in the other heat exchanger. This low pressure gas then returns to the heat pump compressor 122. The heat pump expansion valve has conventional structure and is combined with a conventional flow valve system that permits the heat pump to circulate working fluid through the line 124 in the forward direction (FWD) and in the opposite direction (REV). The heat pump compressor is preferably driven by an electric motor that uses electrical power generated by a conventional aircraft generator or engine mounted generator. Alternatively, the compressor of the heat pump can be driven directly through a mechanical transmission with the engine shaft. The former is preferable because it more readily permits control of the heat pump compressor speed and thus provides greater control of the heat transfer control module.

In the specific application depicted in FIG. 4, the first heat exchanger 126 of the heat transfer control module 120 cooperates with an engine main lubrication subsystem 140, which includes an entry oil line 142 that introduces relatively hot lubricating oil to the system from the engine, denoted by the legend "From Engine" in FIG. 4. The oil in the entry line 142 typically comes from one or more bearing sumps in the engine (see sump 182 in U.S. Pat. No. 4,020,632). This oil, which is at an elevated temperature after having been used to lubricate engine bearings in a high temperature environment, is introduced to an inlet of the heat exchange path 130 of the first heat exchanger 126. This heat exchange path is in heat-conducting relation with the heat pump working fluid, which is circulating in the heat exchange path 128 of the same heat exchanger. The construction of such heat exchange paths for maximizing heat transfer between the fluids is well known to those skilled in this art. An exit oil line 144 leads from the heat exchanger to an oil reservoir 146, which serves as a thermal capacitor in accordance with the description of the system operation further below. From the oil reservoir 146 the oil is pumped back to the engine, as denoted by the legend "To Engine," through a return oil line 148.

Many aircraft engine lubrication subsystems have multiple lubricating oil sumps at different locations in the engine. The invention can be adapted for use with such engines in a variety of ways. For example, the multiple oil lines can be consolidated into a single oil line, which is introduced into the heat exchange path 130 of the heat exchanger 126. Alternatively, the heat exchange path 130 can include individual passages through the heat exchanger for the multiple oil lines. It is within the scope of the invention to configure the passages through the heat exchangers to tailor the amount of heat transferred between each passage and the heat pump working fluid.

The second heat exchanger 132 of the heat transfer control module 120 cooperates with an engine fuel delivery subsystem 150. The engine fuel delivery subsystem includes a fuel line 152 that leads from an aircraft fuel tank, as denoted by the legend "From Tank," to a conventional fuel pump 154. The pump introduces the fuel to the heat exchange path 136 of the heat exchanger 132. This heat exchange path is in heat-conducting relation with the heat pump working fluid, which is circulating in the heat exchange path 134 of the same heat exchanger. An exit fuel line 156 leads from the heat exchanger to a fuel control valve 157. As discussed above in connection with the conventional systems shown in FIGS. 1 to 3, the valve 157 regulates the fuel flow through an engine fuel line 158 leading to the combustors of the engine ("To Combustors"), where it is burned to provide propulsive power in the conventional manner.

Operation of the thermal management system will be considered first from the standpoint of engine operational conditions at a portion of the aircraft mission in which the oil in the entry line 142 is to be cooled. The system is under the control of a suitable control subsystem that includes temperature sensors 160 and 162 in the entry oil line 142 and the exit fuel line 156, respectively. If the oil temperature sensor 160 indicates that the oil temperature exceeds a predetermined set point, which will depend largely on the characteristics of the oil, or if both the oil temperature sensor and the fuel temperature sensor are below predetermined set points, the control subsystem operates the heat pump 122 so that the working fluid circulates in the FWD direction. That is, when both the oil and the fuel are below operating limits, the system operates in the FWD mode to cool oil and increase the available thermal capacitance in the oil reservoir for the occasion when the fuel temperature is at or above its operating limit and the system is operated in the REV mode.

Starting at the inlet to the heat exchange path 128 of the first heat exchanger 126, the working fluid has transferred much of its heat content to the fuel while cooling and condensing in passing through the second heat exchanger 132 and has flashed to a liquid/gaseous mixture in passing through the expansion valve 123. Then in the first heat exchanger 126 heat is transferred from the hot oil in the heat exchange path 130 to the cooler heat pump liquid/gaseous working fluid passing through the heat exchange path 128, as indicated by the FWD arrow. As a result, the heat pump working fluid is heated and converted to a fully gaseous state. The working fluid then enters the heat pump compressor 122, which compresses it so that it becomes a high pressure, higher temperature gas, in accordance with conventional heat pump operation. This working fluid then enters the heat exchange path 134 of the second heat exchanger 132, where it transfers heat to the engine fuel in the heat exchange path 136, signified by the FWD arrow. As a result, the working fluid condenses and becomes a liquid, to be introduced to the expansion valve 123 and thence to the first heat exchanger 126, as discussed above. This forward mode of operation can be considered "normal" operation, since under most engine operating conditions the oil will require cooling and the engine fuel can operate as a heat sink for the heat extracted from the engine oil.

Figure 1:
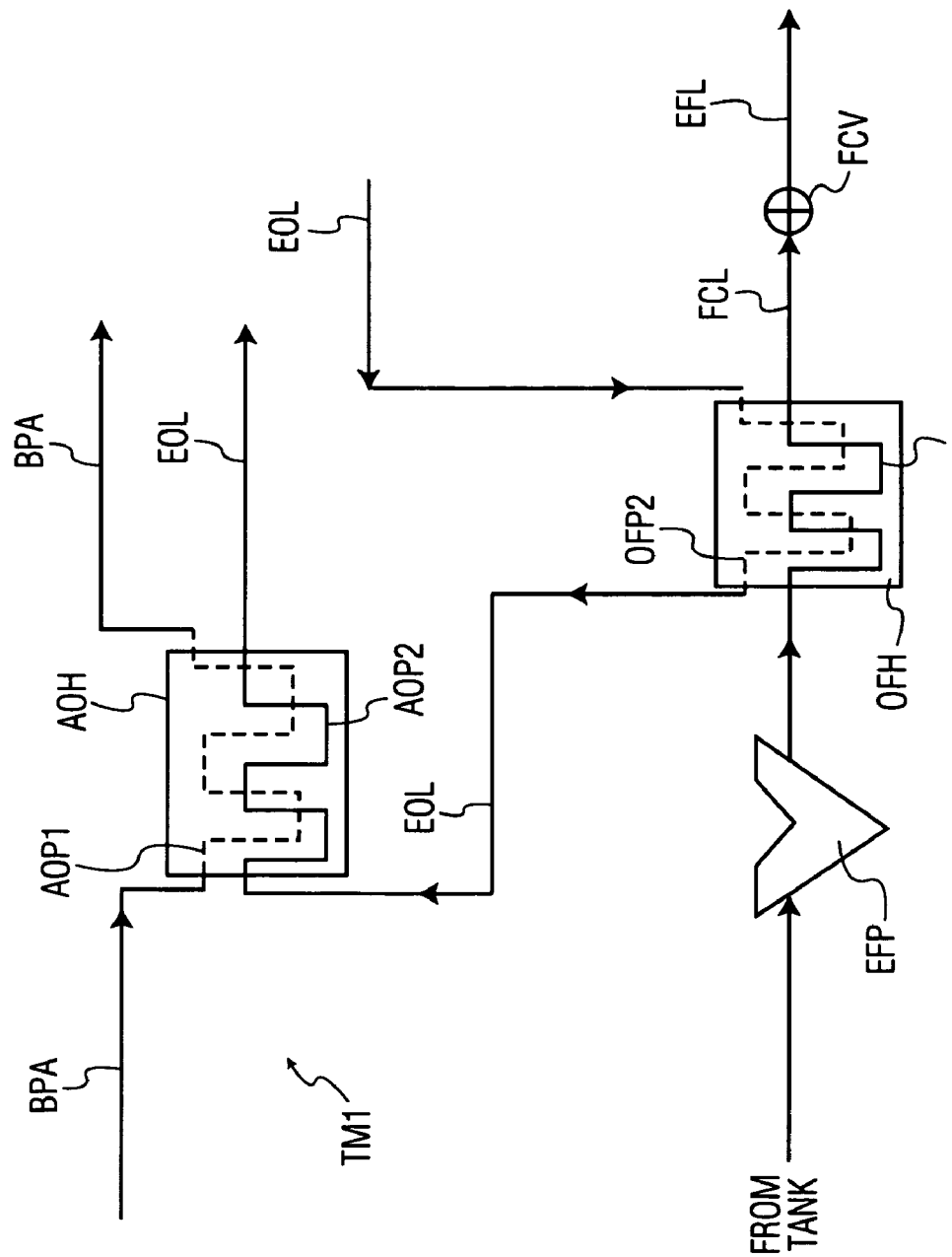
FIGS. 1 to 3 are schematic depictions of notional gas turbine engine thermal management systems that include features known in the prior art.

In fact, this is the operational condition represented by the thermal management system described in connection with FIG. 1. However, the system 110, because it incorporates a heat transfer control module 120 in accordance with the invention, is superior to a prior system like the one in FIG. 1 in a variety of ways. For one, the heat transfer between the heat pump working fluid and the engine fluids (oil and fuel) is more efficient because the heat transfer fluids are largely liquid, by which heat is transferred to and from the walls of the heat exchange paths more efficiently than air (as in the use of fan by-pass duct air for cooling). This is true even in the portion of the cycle in which the working fluid is vaporized or condensed while passing through the heat exchanger because the film coefficient (convective heat transfer coefficient) for a vaporizing or condensing liquid is many times greater than that for a gas that is not undergoing a change of state. As a result, the heat exchangers in the thermal management system can be made smaller, and therefore lighter, than those relying upon air for cooling. Since weight is a major consideration in aircraft engine design, this is a significant improvement. Moreover, the heat exchangers in the thermal management system 110 of FIG. 4 do not rely on bypass duct airflow for cooling, and thus do not form an obstruction to bypass duct air flow, as in the system depicted in FIG. 1. Thus, a system according to this embodiment of the invention eliminates a pressure loss in the bypass duct air stream, thereby providing an increase in propulsive thrust.

Another advantage that accrues through the use of a heat transfer control module according to the present invention is the ability to manage temperatures under conditions that present major difficulties for conventional systems. For example, if an aircraft is on the ground on a hot day, with its engines in an idle condition, the resulting low fuel flow rate results in increased engine inlet fuel temperatures that can cause the fuel to reach unacceptable temperatures when exiting the engine fuel pump and the oil/fuel heat exchanger. In this on-ground idling portion of the aircraft mission, the heat load on the oil is not as great as it is at a flight conditions where power settings are higher. Further, the oil in the oil reservoir 146 has been reduced in temperature by the transfer of heat to the fuel at conditions where fuel flow rates were higher. Accordingly, it would be advantageous to be able to cool the engine fuel by transferring heat from the fuel to the oil at this ground idle condition. This can be accomplished using the heat transfer control module 120 with the heat pump fluid circulating in the reverse direction as denoted by the REV arrows, referred to herein as the "reverse operational mode" of the heat transfer control module. This mode of operation would be initiated when the temperature sensor 162 indicates that the fuel is approaching a limit temperature, and the control system would initiate operation of the heat transfer control module 120 in the reverse direction. Operation of the heat transfer control module 120 in the reverse direction will result in oil temperature increasing in the oil reservoir 146. This reservoir will be sized to provide the thermal capacitance needed to accommodate the desired time period of "reverse" operation without exceeding oil temperature limits, taking into account the initial oil temperature in the oil reservoir 146 following sustained operation at cruise conditions where the oil was being cooled and the reduction in lubrication system heat loads at low power conditions.

Operation of the thermal management system 110 will now be considered from the standpoint of operational conditions where the fuel from fuel line 152 is to be cooled, such as the ground-idle operating condition described above. Starting at the inlet to the heat exchange path 134 of the second heat exchanger 132, the working fluid in this mode of operation is a liquid/gas mixture, having transferred much of its heat content to the oil in passing through the first heat exchanger 126 where it was condensed to a liquid and having passed through expansion valve 123 where it expanded to a liquid/gas mixture. As the working fluid passes through the second heat exchanger 132, heat is transferred from the hot fuel in the heat exchange path 136 to the cooler heat pump working fluid in the heat exchange path 134, as indicated by the REV arrow. As a result, the heat pump working fluid is heated and converted to a fully gaseous state. The working fluid then enters the heat pump compressor 122, which compresses it so that it is further heated, in accordance with conventional heat pump operation. This hot working fluid then enters the heat exchange path 128 of the first heat exchanger 126, where it transfers heat to the engine oil in the heat exchange path 130, signified by the REV arrow. As a result, the working fluid is cooled and becomes a liquid, to be introduced to the expansion valve 123 and the second heat exchanger 132, as discussed above. Accordingly, unlike conventional systems, the heat transfer control module, with its reversible heat pump, enables both the fuel and the oil to be maintained at appropriate temperatures at different portions of the aircraft mission.

A preferred embodiment of the invention includes the oil reservoir 146 to enhance the thermal management capability of the system. For example, in the reverse operational mode, in which heat is transferred to the engine oil, the oil could overheat in certain environments, since it is heated when passing through the heat exchanger 126 and also as it passes through the engine to perform its intended lubricating and cooling function. In order to increase the capacity of the oil to act as a heat sink without overheating, an oil reservoir to collect the oil can be incorporated as part of the thermal management system. In that regard, it should be understood that many types of aircraft engines include oil tanks from which oil is pumped under pressure to the engine lubricating system. By introducing the oil exiting the heat exchanger 126 into the oil tank, and by properly sizing the oil tank so that it can act as a heat capacitor in accordance with the present discussion, it will further enhance the thermal management capability of the system 110 according to the present invention.

In some applications, it may not be possible to place the heat exchangers 126 and 132 in close proximity to each other. As a result, it may be preferable to incorporate multiple expansion valves into the heat transfer control module so that a heat exchanger is sufficiently close to an expansion valve to ensure proper operation. For example, it will be within the skill of those who work in this art to employ appropriate plumbing and valving to enable selective circulation of working fluid through an expansion valve in proximity to the heat exchanger 126 when operating in the FWD mode and through an expansion valve in proximity to the heat exchanger 132 when operating in the REV mode.

Figure 2:
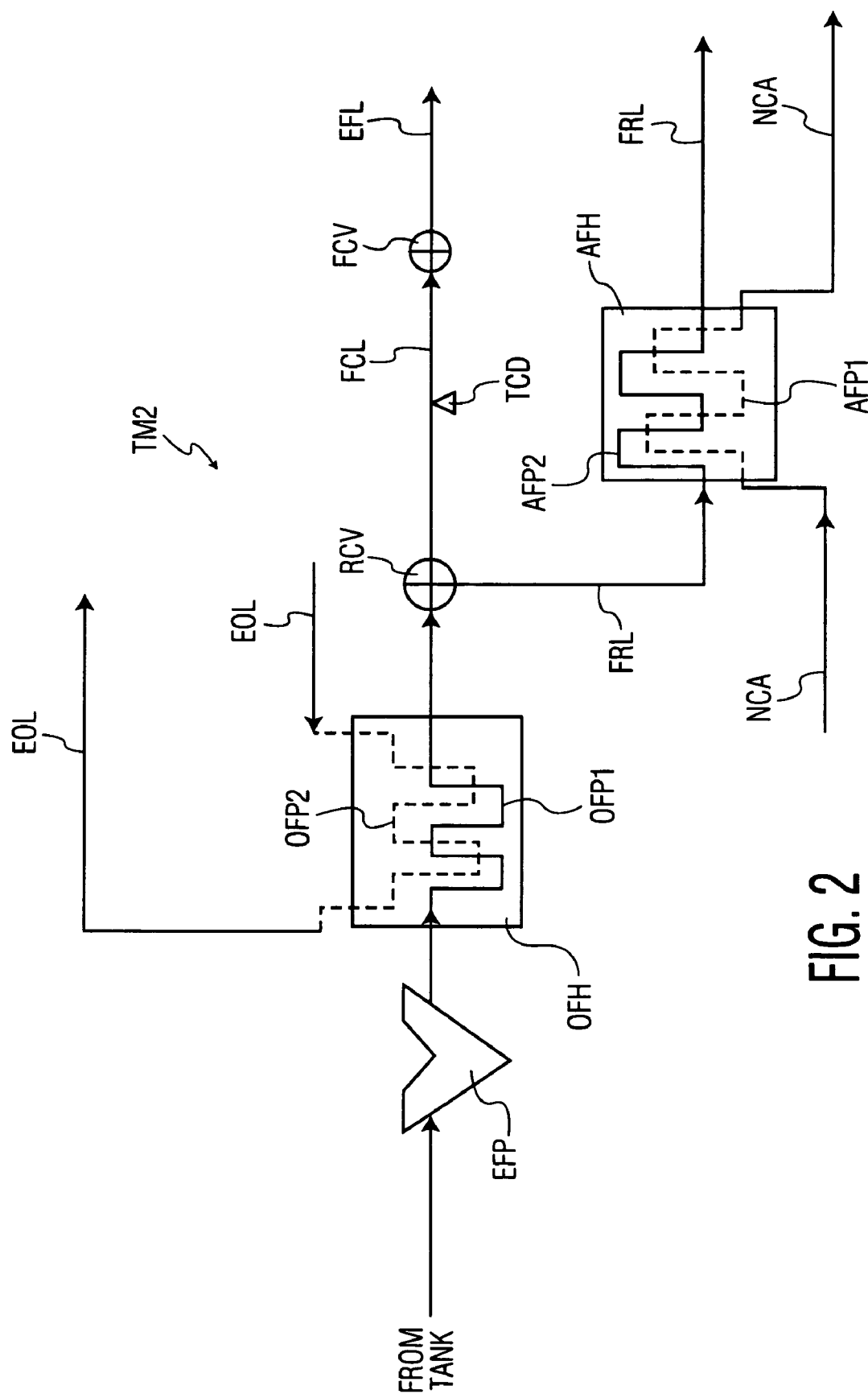
Figure 5:
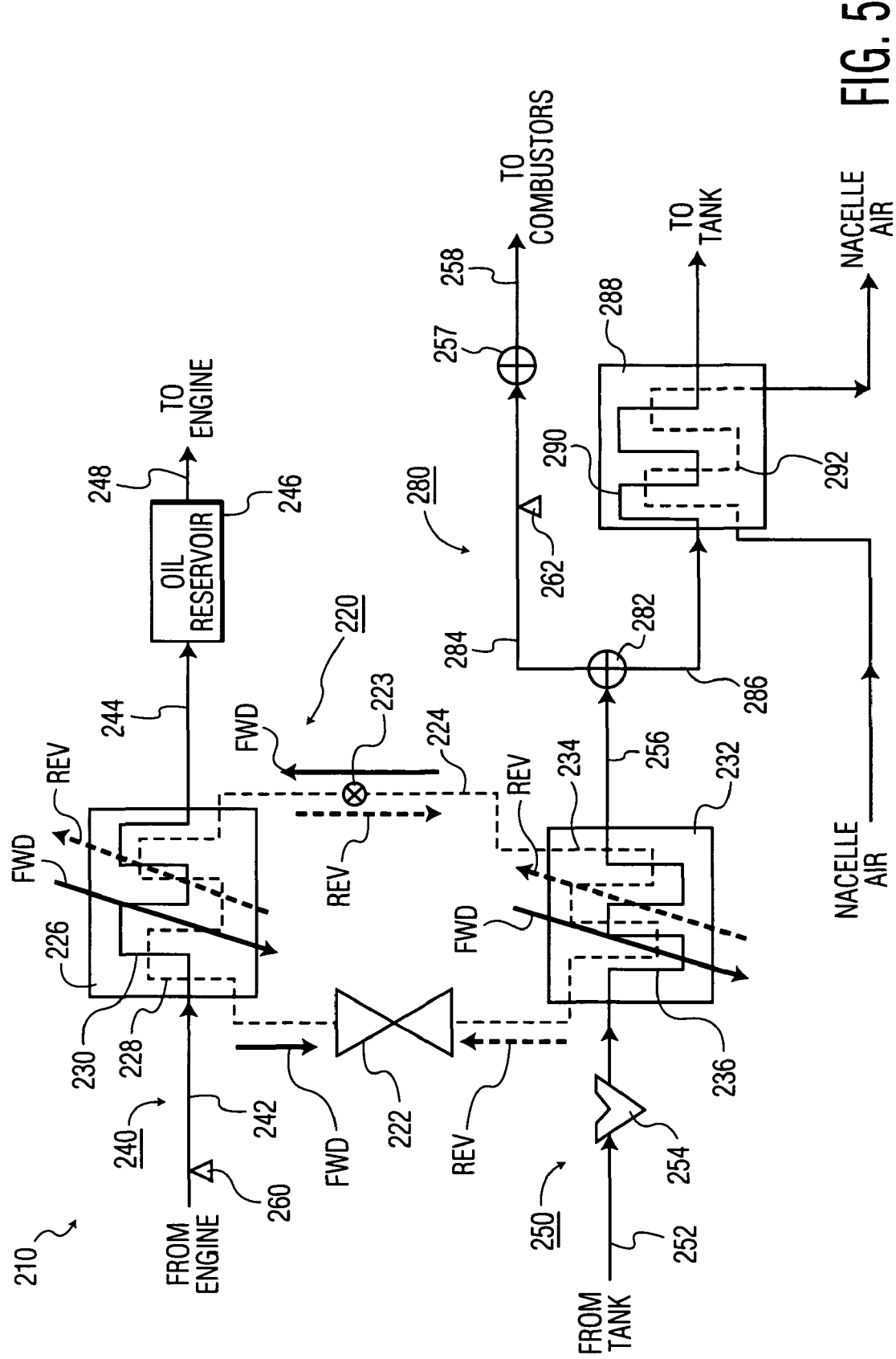
FIG. 5 is a schematic depiction of a thermal management system for an aircraft gas turbine engine according to a second embodiment of the present invention.

FIG. 5 illustrates a thermal management system 210 according to a second embodiment of the invention, in which a heat transfer control module 220 is used in cooperation with a conventional fuel re-circulation system such as the one depicted in FIG. 2. In the embodiment shown in FIG. 5, components that represent counterparts of components shown in FIG. 4 are given a "200" series reference number. In that same regard, components in FIG. 5 are constructed and operate in a fashion similar to corresponding components in FIG. 4, as described in detail above. Accordingly, one skilled in this art will readily understand the construction and operational principles of the heat transfer control module 220 in FIG. 5 by reference to the description above in connection with FIG. 4, and for that reason the following description focuses mainly on the differences between the systems shown in FIGS. 4 and 5.

A basic difference between the thermal management system 110 shown in FIG. 4 and its counterpart embodiment 210 shown in FIG. 5 is that the fuel exit line 256 from the second heat exchanger 232 leads to a fuel recirculation subsystem 280, and more particularly to a fuel re-circulation valve 282 of the fuel recirculation subsystem. The valve 282 corresponds to the valve RCV shown in FIG. 2. One output of the valve is an exit fuel line 284 that leads to a fuel control valve 257, from which an engine fuel line 258 supplies fuel to the engine combustors. A second outlet of the valve 282 leads to a fuel recirculation line 286. The fuel recirculation line 286 is introduced to an auxiliary heat exchanger 288 with a first heat exchange path 290 for the fuel, the outlet of which re-introduces the fuel to the engine fuel tank. A second heat exchange path 292 accepts a small portion of the inlet or nacelle air flow, as described in connection with the systems depicted in FIG. 2. More particularly, heat from the fuel in the heat exchange path 290 is transferred to the air flowing through the heat exchange path 292, as described in connection with the system TM2 shown in FIG. 2.

The thermal management system 210 according to the present embodiment has certain operational advantages over a basic system 110 such as that described in connection with FIG. 4. For example, in the forward operational mode described above, heat is transferred to the fuel from the heat pump working fluid. Operating conditions in certain portions of a aircraft's mission can lead to fuel temperatures that exceed acceptable limits in this operational mode. The recirculation subsystem 280 provides additional cooling capacity for the fuel. It does this by employing a temperature sensor 262 in the fuel line 284 leading to the fuel control valve 257 and the engine combustors. If this temperature sensor indicates that the fuel has reached a temperature limit, the control system causes the fuel pump 254 to increase the fuel flow rate, while at the same time modulating the valve 282 to introduce a greater portion of the fuel in the line 256 to the heat exchanger 288. In this fashion the fuel flow rate to the combustors is maintained at the proper level, while the temperature of the fuel is reduced by the increase in total fuel flow rate. The increase in fuel tank temperature due to the re-circulated fuel flow is minimized by transferring heat from the re-circulated fuel to the inlet or nacelle air.

Another advantage of the thermal management system 210 is that it can be retrofit to an existing thermal management system using a fuel re-circulating subsystem, like the one shown in FIG. 2. In that regard, the heat transfer control module 220 would essentially replace the heat exchanger OFH in FIG. 2. Those skilled in the art would be readily capable of designing the heat transfer control module 220 to cooperate with an existing fuel recirculation subsystem to operate in accordance with the principles discussed above. It is also contemplated that the present invention, with its increased temperature control capabilities, will make it possible to minimize or eliminate the air/fuel heat exchanger in some aircraft with fuel re-circulation systems. It will also be understood that features described in connection with one embodiment of the invention can be incorporated into other embodiments, as appropriate, without repeating the description of such features for each of the embodiments described herein.

Figure 6:
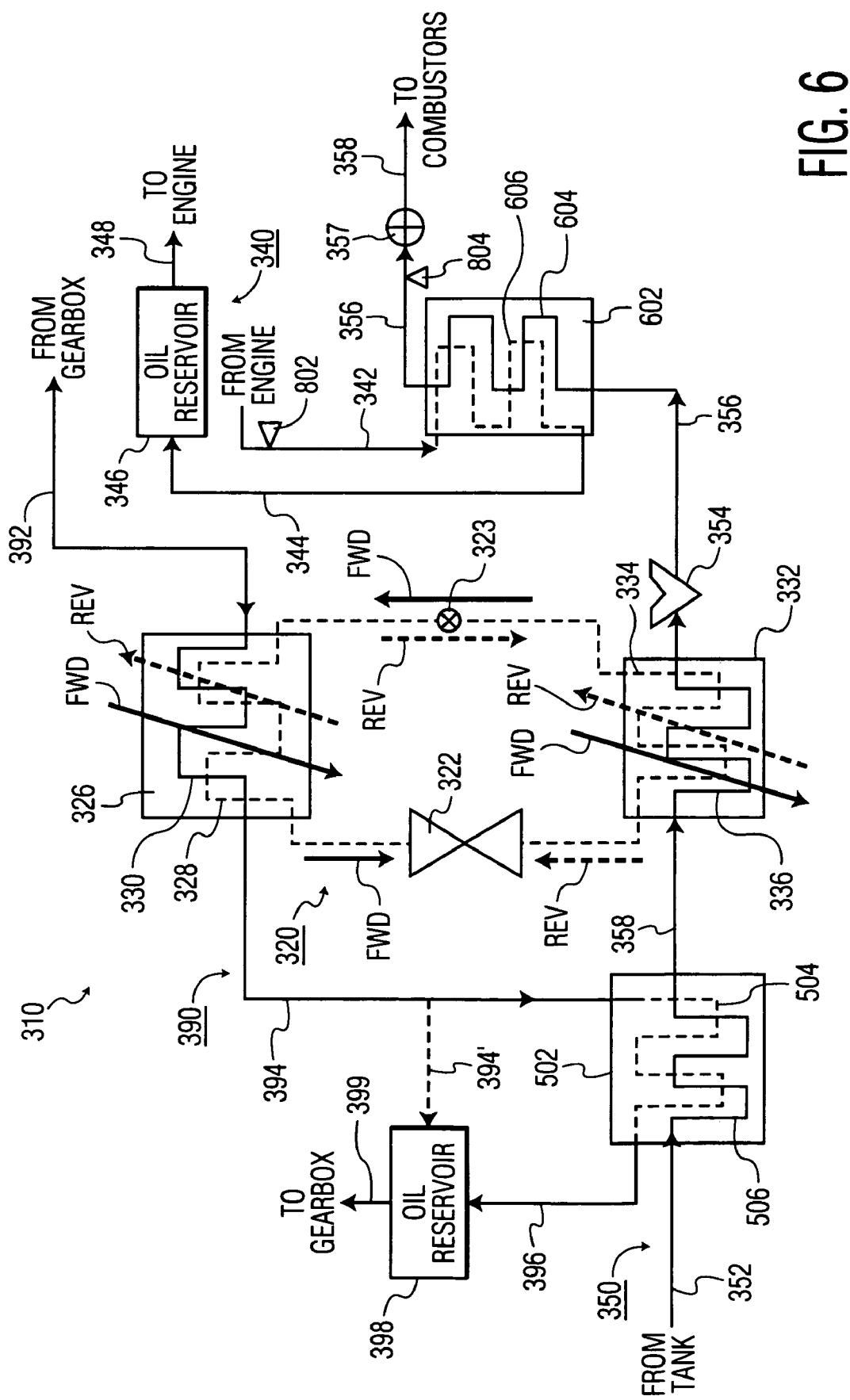
FIG. 6 is a schematic depiction of a thermal management system for an aircraft gas turbine engine according to third and fourth embodiments of the present invention.

FIG. 6 illustrates a thermal management system 310 according to third and fourth embodiments of the invention, in which a heat transfer control module 320 is used in a complex cooling system with a separate gearbox lubrication system (see above in connection with FIG. 3). In the embodiment shown in FIG. 6, components that represent counterparts of components shown in FIGS. 4 and 5 are given a "300" series reference number. In that same regard, components in FIG. 6 are constructed and operate in a fashion similar to corresponding components in FIGS. 4 and 5, as described in detail above. Accordingly, one skilled in this art will readily understand the construction and operational principles of the heat transfer control module 320 in FIG. 6 by reference to the description above in connection with FIGS. 4 and 5, and for that reason the following description focuses mainly on the differences between the systems shown in FIGS. 4 and 5, on the one hand, and FIG. 6 on the other.

In addition to elements found in the thermal management systems depicted in FIGS. 4 and 5, the system 310 further includes a gearbox lubrication subsystem 390 that circulates lubricant separate from the engine main lubrication subsystem 340. The gearbox lubrication subsystem includes an entry oil line 392 that introduces relatively hot lubricating oil from an aircraft engine fan drive gearbox, open rotor gearbox, or propeller gearbox ("From Gearbox"). The oil line 392 introduces the hot oil to the heat exchange path 330 of the heat exchanger 326 in the heat transfer control module 320. The oil line 392 typically comes from one or more gearbox sumps. An exit oil line 394 leads from the heat exchanger 326 to a first auxiliary fuel/oil heat exchanger 502, and more particularly to a first heat exchange path 504 thereof. Fuel from the fuel tank is introduced to the other heat exchange path 506 of the heat exchanger 502, for a purpose described in more detail below. An exit oil line 396 from the heat exchanger 502 leads to a gearbox oil reservoir 398, and from there it is pumped back to the gearbox through a return oil line 399. The first auxiliary heat exchanger thus transfers heat between the gearbox lubricating oil and the engine fuel.

In a variation on the described third embodiment, a fourth embodiment can omit the first auxiliary heat exchanger 502. In that case, the exit oil line 394 is introduced via line 394' directly to the oil reservoir 398. For most operating conditions the first auxiliary heat exchanger 502 transfers additional heat from the gearbox lubrication oil to the fuel, reducing the heat transferred by the heat pump, and thus the power required to operate the heat pump in the forward operational mode. When operating in the reverse operational mode, this will result in an increase in the power required to operate the heat pump. Inclusion or omission of the first auxiliary heat exchanger 502 in the system would be determined by weighing its benefit in the forward operational mode versus the penalty when operating in the reverse operational mode as well as weight and cost considerations if it is included in the system.

Another difference in the thermal management system 310 according to the present embodiment is the inclusion of a second auxiliary fuel/oil heat exchanger 602 with a first heat exchange path 604 that accepts fuel from the exit line 356 of the engine fuel pump 354. The other heat exchange path (or paths, see above) 606 accepts engine lubricating oil from the oil entry line 342 from the engine sump(s). The second auxiliary heat exchanger thus transfers heat between the engine lubricating oil and the engine fuel. The thermal management system 310 includes an oil temperature sensor 802 that provides an output indicative of the temperature of the relatively hot oil in the oil entry line 342 from the engine sump(s). The oil temperature sensor 802 may be placed in an oil line from a selected single sump (the one with the hottest oil, for example), or in an oil line that combines the oil flow from multiple sumps (as depicted in FIG. 6). Alternatively, multiple oil temperature sensors may be used to establish the oil temperature used for control purposes. (This likewise applies for the oil temperature sensors 160 and 260 in thermal management systems 110 and 210 depicted in FIGS. 4 and 5). A fuel temperature sensor 804 provides an output indicative of the temperature of the fuel being introduced to the engine combustors through the exit fuel line 356.

As has been discussed already, many aircraft engine lubrication subsystems have multiple lubricating oil sumps at different locations in the engine and the invention may be adapted for use with such engines. In addition, gearbox lubrication systems may also have more than one sump. The present invention can be adapted for use with such engine configurations in a variety of ways. For example, multiple oil lines from multiple gearbox sumps can be consolidated into a single gearbox oil line, which is introduced into the heat exchange path 330 of the heat exchanger 326. Alternatively, the heat exchange path 330 can include individual passages through the heat exchanger for the multiple gearbox oil lines. It is within the scope of the invention to configure the passages to tailor the amount of heat transferred between each passage and the heat pump working fluid.

Figure 7:
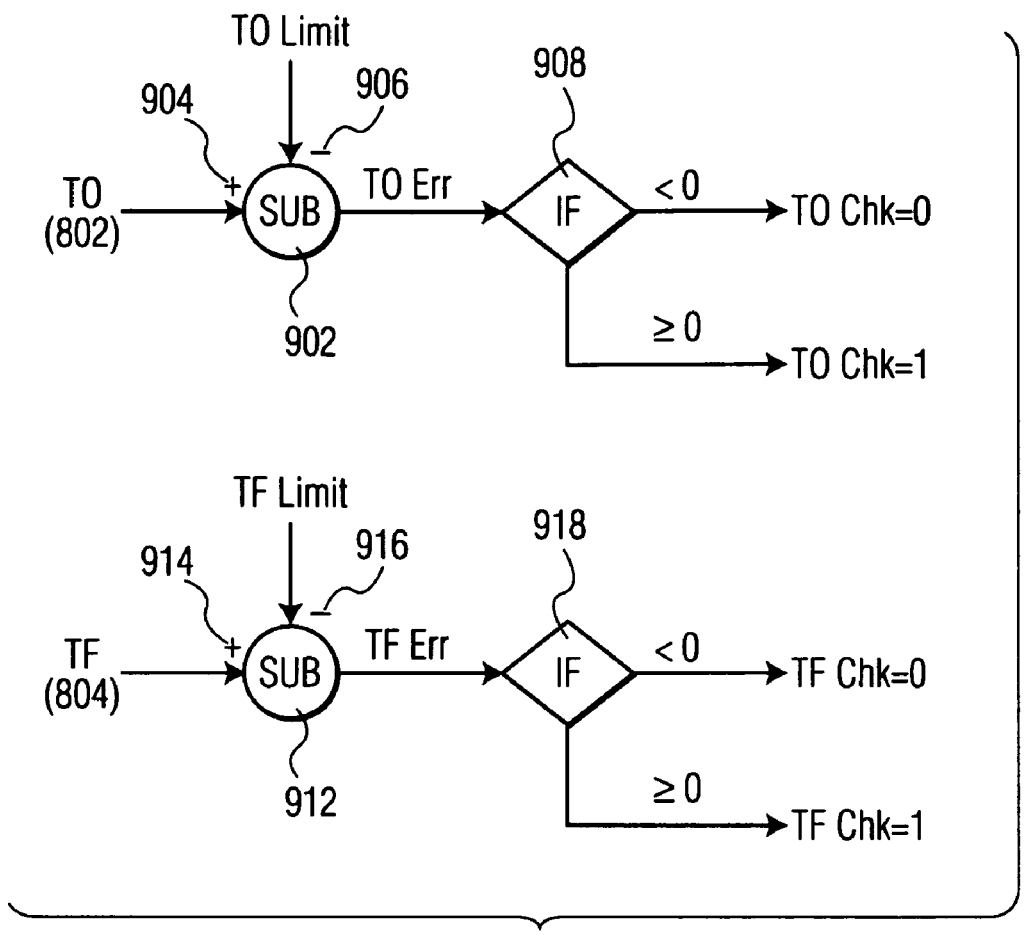
FIGS. 7 and 8 depict logic elements of a control system that can be used with the thermal management system depicted in FIG. 6.
Figure 8:
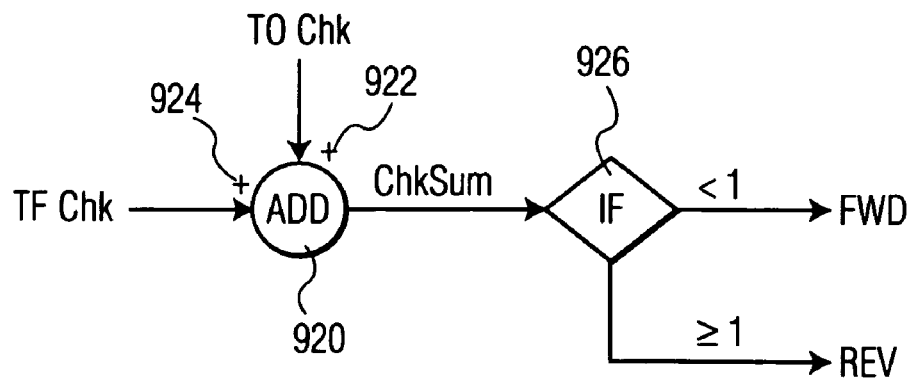

Many different schemes for control logic may be utilized to accomplish the operation of thermal management systems 110, 210, and 310 described above. To illustrate how well known control methods might be used to accomplish the described operation for these systems, FIGS. 7 and 8 are examples of basic logic that could be used to control the thermal management system 310 shown in FIG. 6. Taking FIG. 7 first, the temperature of the oil TO in entry line 342, as indicated by the sensor 802, is introduced to a subtractor 902 at the plus input 904. An oil limit temperature TO Limit, related to the maximum operating temperature of the engine oil, is introduced to the subtractor 902 at its subtracting input 906. The subtraction result, TO Err, is input to a comparator 908. If TO Err is positive, it indicates that the oil temperature has exceeded the set maximum TO Limit, and a TO Chk flag is set to 1 (one). If the subtraction result is less than zero, it indicates that the oil temperature remains within its acceptable range and the TO Chk flag is set to 0 (zero). By the same token, the temperature of the fuel TF in the exit line 356, as indicated by the sensor 804, is introduced to a subtractor 912 at the plus input 914. A fuel limit temperature TF Limit, related to the maximum operating temperature of the engine fuel, is introduced to the subtractor 912 at its subtracting input 916. The subtraction result TF Err is input to a comparator 918. If TF Err is positive, it indicates that the fuel temperature has exceeded the set maximum TF Limit, and a TF Chk flag is set to 1 (one). If the subtraction result is less than zero, it indicates that the fuel temperature remains within its acceptable range and the TF Chk flag is set to 0 (zero).

FIG. 8 indicates how the TO Chk flag and TF Chk flag are used to control the heat transfer control module 320 in FIG. 6. An adder 920 has a first input 922 to which the TO Chk flag is introduced, and a second input 924 to which the TF Chk flag is introduced. The adder produces a value ChkSum representing the sum of the TO Chk flag and the TF Chk flag, which is in turn introduced to a comparator 926. If ChkSum is less than 1, it indicates that both the engine lubricating oil and the fuel temperatures remain below their respective limit values represented by TO Limit and TF Limit, discussed above. In that event the heat transfer control module 320 is operated in its forward operational mode, in which the heat pump working fluid circulates in the direction of the FWD arrows in FIG. 6. Consequently, heat is transferred from the gearbox oil to the working fluid in the heat exchanger 326 and heat is transferred from the working fluid to the fuel in the heat exchanger 332. If ChkSum is equal to or greater than 1 (one), it indicates that either the fuel or the engine lubricating oil temperature has exceeded its operational limit, and the heat transfer control module 320 is operated in its reverse operational mode, in which the heat pump working fluid circulates in the direction of the REV arrows in FIG. 6. Consequently, heat is transferred to the gearbox oil from the working fluid in the heat exchanger 326 and heat is transferred to the working fluid from the fuel in the heat exchanger 332.

The gearbox oil temperature could be used as an additional control input, but typically the oil reservoir 398 will be sized to enable the gearbox lubricant to be maintained below its limit temperature. It is also possible to further refine the control system so that the heat pump compressor is turned off unless temperature sensors in the system indicate that thermal management is required. In addition, the heat pump compressor operation can be modulated by using power levels controlled by temperature sensors in the system, if operation at less than maximum power will provide sufficient cooling. In addition, those skilled in the art, particular with regard to control system design, will immediately recognize that the above description of exemplary control elements (see FIGS. 7 and 8) is simplified for the sake of simplifying the explanation of the operation of this aspect of the invention. In practice, the control logic will make use of "dead bands" or other methods to produce hysteresis so that the system is not constantly cycling between FWD and REV operation.

Integration of aircraft system sensors and algorithms for aircraft fuel quantity, aircraft fuel temperature, and aircraft subsystem heat input may be used to further optimize control of the heat pump operation, minimizing the heat pump power requirements. Variations of the system configuration shown in FIG. 6 are numerous, and would be defined to best address the various aircraft and engine system heat loads, the timing of these heat loads in the aircraft mission, and the fuel flow required for engine operation at these various conditions. For example, a heat transfer control module could be used to provide cooperation of a heat exchanger within the main engine lubricant system and one within the gearbox lubrication system; This heat transfer control module could be in lieu of or in addition to the heat transfer control module shown in FIG. 6. Those skilled in the art will be capable of constructing any number of systems employing combinations and permutations of the systems described in FIGS. 4 to 6, and it is unnecessary to further describe all of the numerous systems that can be envisioned that will incorporate the principles and structure of the present invention. There are also numerous mechanical arrangements possible for the systems shown. For instance, a heat exchanger that is an integral part of the heat transfer control module could be mechanically integrated with the reservoir within the gearbox or engine lubrication system to minimize system weight or volume.

In addition to variations described above that are possible within the engine system, it is also possible to further integrate aircraft and engine subsystems to permit cooperation of heat exchangers that are part of an aircraft subsystem with heat exchangers that are part of an engine subsystem within a heat transfer control module. For example, when it is advantageous to do so, a heat exchanger that exchanges heat between the aircraft fuel supply (prior to delivery to the engine) and the heat pump working fluid could be combined with a heat exchanger that exchanges heat between the heat pump working fluid and the engine lubricant. These embodiments could use reservoirs for thermal capacitance that were part of both engine and aircraft subsystems as well, taking advantage of the reversible heat pump to maximize heat input to fuel consumed by the engine while observing allowable fuel temperature limits throughout both aircraft and engine subsystems.

Those skilled in the art will readily recognize that only selected preferred embodiments of the invention have been depicted and described, and it will be understood that various changes and modifications can be made other than those specifically mentioned above without departing from the spirit and scope of the invention, which is defined solely by the claims that follow.

What is claimed is:

1. A thermal management system for a gas turbine powerplant having a first supply line for supplying to the powerplant a first operating fluid comprising a lubricant and a second supply line for supplying to the powerplant a second operating fluid comprising a powerplant fuel, the system including a heat transfer control module comprising:
    a reversible heat pump including a working fluid line having therein a heat pump compressor for circulating working fluid in forward and reverse directions through said fluid line and an expansion valve for expanding working fluid passing therethrough, wherein the working fluid is not the lubricant or the fuel;
    a first heat exchanger having a first heat exchange path for circulating the working fluid between said compressor and said expansion valve and a second heat exchange path included in the first supply line, wherein said first and second heat exchange paths permit heat to be exchanged between fluids therein; and
    a second heat exchanger having a first heat exchange path for circulating the working fluid between said compressor and said expansion valve and a second heat exchange path included in the second supply line, wherein said first and second heat exchange paths permit heat to be exchanged between fluids therein.

2. A system as in claim 1 for use with a powerplant comprising a gas turbine aircraft engine, wherein:
    said first supply line comprises an oil line for introducing the lubricant to an inlet of said second heat exchange path of said first heat exchanger and to the engine from an outlet of said second heat exchange path of said first heat exchanger, the lubricant being re-introduced to said inlet from the engine;
    an oil reservoir for collecting the lubricant before introduction to the engine is disposed in said oil line between said first heat exchanger and the engine; and
    said second supply line comprises a fuel line for introducing the fuel to an inlet of said second heat exchange path of said second heat exchanger and to an engine combustor from an outlet of said second heat exchange path of said second heat exchanger.

3. A system as in claim 2, wherein said first supply line comprises multiple individual oil lines from corresponding oil sumps in the aircraft engine and said second heat exchange path of said first exchanger has multiple inlets for accepting the lubricant from said oil lines and multiple outlets for re-circulating the lubricant to corresponding oil sumps.

4. A system as in claim 3, wherein said reservoir collects the lubricant from multiple said oil lines.

5. A system as in claim 2, wherein:
    said fuel line includes a fuel recirculation valve between said second heat exchanger and the engine combustor;
    said recirculation valve has a first outlet for introducing the fuel to the engine combustor and a second outlet for introducing the fuel to a fuel recirculation line, said recirculation valve being controllable to modulate the flow rate of fuel to the combustor and said fuel recirculation line;
    the system further comprises an auxiliary heat exchanger having a first heat exchange path for receiving the fuel from said recirculation valve and a second heat exchange path for receiving air, said first and second heat exchange paths permitting heat to be exchanged between fluids therein; and
    said fuel recirculation line introduces the fuel from said first heat exchange path of said auxiliary heat exchanger to an aircraft fuel tank.

6. A system as in claim 1 for use with a powerplant comprising a gas turbine aircraft engine having a gearbox with a separate gearbox lubrication system, wherein:
    the lubricant includes gearbox lubricating oil and engine lubricating oil;
    said first supply line comprises a gearbox oil line for introducing the gearbox lubricating oil to an inlet of said second heat exchange path of said first heat exchanger from an engine gearbox and to a gearbox oil exit line from an outlet of said second heat exchange path of said first heat exchanger; and
    said second supply line comprises a fuel line for introducing the fuel to an inlet of said second heat exchange path of said second heat exchanger and to an outlet of said second heat exchange path of said second heat exchanger, the system further comprising:
    a gearbox oil reservoir for collecting the gearbox lubricating oil before introduction to the gearbox disposed in said gearbox oil line between said first heat exchanger and the gearbox, the gearbox lubricating oil being re-introduced from the gearbox to said inlet of said second heat exchange path of said first heat exchanger;
    an auxiliary heat exchanger having a first heat exchange path for receiving the fuel from said outlet of said second heat exchange path of said second heat exchanger and a second heat exchange path for receiving engine lubricating oil from the engine, said first and second heat exchange paths permitting heat to be exchanged between fluids therein; and
    an engine oil reservoir for collecting the engine lubricating oil before introduction to the engine disposed in said engine oil line between said auxiliary heat exchanger and the engine, the engine lubricating oil being re-introduced from the engine to said inlet of said second heat exchange path of said auxiliary heat exchanger.

7. A system as in claim 6, wherein said first supply line comprises multiple individual gearbox oil lines from corresponding gearbox oil sumps and said second heat exchange path of said first heat exchanger has multiple inlets for accepting the gearbox oil from said gearbox oil lines and multiple outlets for re-circulating the gearbox oil to corresponding gearbox oil sumps.

8. A system as in claim 1 for use with a powerplant comprising a gas turbine aircraft engine having a gearbox with a separate gearbox lubrication system, wherein:
    the lubricant includes gearbox lubricating oil and engine lubricating oil;
    said first supply line comprises a gearbox oil line for introducing the gearbox lubricating oil to an inlet of said second heat exchange path of said first heat exchanger from an engine gearbox and to a gearbox oil exit line from an outlet of said second heat exchange path of said first heat exchanger; and
    said second supply line comprises a fuel line for introducing the fuel to an inlet of said second heat exchange path of said second heat exchanger and to an outlet of said second heat exchange path of said second heat exchanger, the system further comprising:
    a first auxiliary heat exchanger having a first heat exchange path for receiving the gearbox lubricating oil through said gearbox oil exit line and a second heat exchange path with an inlet for receiving the fuel and an outlet for introducing the fuel to said inlet of said second heat exchange path of said second heat exchanger, said first and second heat exchange paths of said first auxiliary heat exchanger permitting heat to be exchanged between fluids therein;

a gearbox oil reservoir for collecting the gearbox lubricating oil before introduction to the gearbox disposed in said gearbox oil line between said first auxiliary heat exchanger and the gearbox, the gearbox lubricating oil being re-introduced from the gearbox to said inlet of said second heat exchange path of said first heat exchanger;

a second auxiliary heat exchanger having a first heat exchange path for receiving the fuel from said outlet of said second heat exchange path of said second heat exchanger and a second heat exchange path for receiving the engine lubricating oil from the engine, said first and second heat exchange paths permitting heat to be exchanged between fluids therein; and an engine oil reservoir for collecting the engine lubricating oil before introduction to the engine disposed in said engine oil line between said second auxiliary heat exchanger and the engine, the engine lubricating oil being re-introduced from the engine to said inlet of said second heat exchange path of said second auxiliary heat exchanger.

9. A thermal management system for use with a gas turbine aircraft engine having a first supply line for supplying to the engine an engine fluid comprising a lubricant and a second supply line for supplying to the aircraft an aircraft fluid comprising at least one of a coolant, engine fuel, and hydraulic fluid, the system including a heat transfer control module comprising:

a reversible heat pump including a working fluid line having therein a heat pump compressor for circulating working fluid in forward and reverse directions through said fluid line and an expansion valve for expanding working fluid passing therethrough, wherein the working fluid is not the engine fluid or the aircraft fluid;

a first heat exchanger having a first heat exchange path for circulating the working fluid between said compressor and said expansion valve and a second heat exchange path included in the first supply line, wherein said first and second heat exchange paths permit heat to be exchanged between fluids therein; and a second heat exchanger having a first heat exchange path for circulating the working fluid between said compressor and said expansion valve and a second heat exchange path included in the second supply line, wherein said first and second heat exchange paths permit heat to be exchanged between fluids therein, wherein:

said first supply line comprises a line for introducing the engine fluid to an inlet of said second heat exchange path of said first heat exchanger and from an outlet of said second heat exchange path of said first heat exchanger to an engine subsystem that uses the engine fluid for operation, the engine fluid being re-introduced to said inlet from the engine subsystem; and said second supply line comprises a line for introducing the aircraft fluid to an inlet of said second heat exchange path of said second heat exchanger and from an outlet of said second heat exchange path of said second heat exchanger to an aircraft subsystem that uses the aircraft fluid for operation, the aircraft fluid being re-introduced to said inlet from the aircraft subsystem.

10. A system as in claim 1, wherein said heat transfer control module further comprises:

a first said expansion valve in said working fluid line proximate to said first heat exchanger and a second said expansion valve in said working fluid line proximate to said second heat exchanger; and a flow control system for selectively circulating working fluid through said first expansion valve when the working fluid is circulated in the forward direction and through said second expansion valve when the working fluid is circulated in the reverse direction.

11. A method for controlling the temperature of first and second operating fluids in a gas turbine powerplant having a first supply line for supplying to the powerplant the first operating fluid comprising a lubricant, a second supply line for supplying to the powerplant the second operating fluid comprising a powerplant fuel, and a heat transfer control module including (1) a reversible heat pump including a working fluid line having therein a heat pump compressor for circulating working fluid in forward and reverse directions through said fluid line and an expansion valve for expanding working fluid passing therethrough, wherein the working fluid is not the lubricant or the fuel (2) a first heat exchanger having a first heat exchange path for circulating the working fluid between said compressor and said expansion valve and a second heat exchange path included in the first supply line, wherein said first and second heat exchange paths permit heat to be exchanged between fluids therein, and (3) a second heat exchanger having a first heat exchange path for circulating the working fluid between said compressor and said expansion valve and a second heat exchange path included in the second supply line, wherein said first and second heat exchange paths permit heat to be exchanged between fluids therein, the method comprising selectively operating said heat pump in one of a forward direction and a reverse direction, wherein:

operation in said forward direction pumps the working fluid through said second heat exchanger, said expansion valve, said first heat exchanger, and back to said heat pump compressor, for transferring heat from the first operating fluid to the working fluid in said first heat exchanger and from the working fluid to the second operating fluid in said second heat exchanger; and operation in said reverse direction pumps the working fluid to said first heat exchanger, said expansion valve, said second heat exchanger, and back to said heat pump compressor, for transferring heat from the working fluid to the first operating fluid in said first heat exchanger and from the second operating fluid to the working fluid in said second heat exchanger.

12. A method as in claim 11 for use with a powerplant comprising a gas turbine aircraft engine, wherein:

said first supply line comprises an oil line for introducing the lubricant to an inlet of said second heat exchange path of said first heat exchanger and to the engine from an outlet of said second heat exchange path of said first heat exchanger, the lubricant being re-introduced to said inlet from the engine;

an oil reservoir for collecting the lubricant before introduction to the engine is disposed in said oil line between said first heat exchanger and the engine; and said second supply line comprises a fuel line for introducing the fuel to an inlet of said second heat exchange path of said second heat exchanger and to an engine combustor from an outlet of said second heat exchange path of said second heat exchanger.

13. A method as in claim 12, further comprising:

operating said heat pump in said forward direction if the temperature of the lubricant exiting the engine exceeds a predetermined value;

operating said heat pump in said reverse direction if the temperature of the fuel exiting the second heat exchanger exceeds a predetermined value; and operating said heat pump in said forward direction to increase the thermal capacitance for operation in the reverse direction if neither the lubricant nor the fuel temperatures exceed their respective predetermined values.

14. A method as in claim 12, further comprising controlling heat exchange between fluids in said heat exchangers by modulating the operation of said heat pump.

15. A method as in claim 12, further comprising using operational information from aircraft and engine subsystems to control said heat pump operation.

16. A method as in claim 15, wherein said information includes at least one of aircraft mission data, fuel quantity, and fuel temperature.

17. A method as in claim 15, wherein said operational information includes temperature information provided by at least one temperature sensor in said engine or an aircraft powered by said engine.

18. A method as in claim 11 for use with a powerplant comprising a gas turbine aircraft engine having a gearbox with a separate gearbox lubrication system, wherein:

the lubricant includes gearbox lubricating oil and engine lubricating oil;

said first supply line comprises an oil line for introducing the gearbox lubricating oil to an inlet of said second heat exchange path of said first heat exchanger from an engine gearbox and to a gearbox oil exit line from an outlet of said second heat exchange path of said first heat exchanger, the engine gearbox lubricating oil being introduced to said inlet from the engine gearbox;

a gearbox oil reservoir for collecting the gearbox lubricating oil before introduction to the gearbox is disposed in said oil line between said first heat exchanger and the gearbox; and said second supply line comprises a fuel line for introducing the fuel to an inlet of said second heat exchange path of said second heat exchanger and an outlet of said second heat exchange path of said second heat exchanger;

the heat transfer control module further includes an auxiliary heat exchanger having a first heat exchange path for receiving the fuel from said outlet of said second heat exchange path of said second heat exchanger and a second heat exchange path for receiving engine lubricating oil from the engine, said first and second heat exchange paths permitting heat to be exchanged between fluids therein;

an engine oil reservoir for collecting the engine lubricating oil before introduction to the engine is disposed in said engine oil line between said auxiliary heat exchanger and the engine, the engine lubricating oil being re-introduced from the engine to said inlet of said second heat exchange path of said auxiliary heat exchanger; and an outlet of said first heat exchange path of said auxiliary heat exchanger is disposed for introducing fuel to a fuel line providing fuel to the engine combustor.

19. A method as in claim 18, further comprising:

operating said heat pump in said forward direction if the temperature of the engine lubricating oil exiting the engine and the fuel entering the combustor do not exceed predetermined values; and operating said heat pump in said reverse direction if the temperature of the fuel entering the combustor exceeds a predetermined value or if the engine lubricating oil exiting the engine exceeds a predetermined value.

20. A method as in claim 18, further comprising controlling heat exchange between fluids in said heat exchangers by modulating the operation of said heat pump.

21. A method as in claim 18, further comprising using operational information from aircraft and engine subsystems to control said heat pump operation.

22. A method as in claim 21, wherein said information includes at least one of aircraft mission data, fuel quantity, and fuel temperature.

23. A method as in claim 21, wherein said operational information includes temperature information provided by at least one temperature sensor in said engine or an aircraft powered by said engine.

* * * * *